(12) United States Patent
Safer

(10) Patent No.: US 9,734,711 B2
(45) Date of Patent: Aug. 15, 2017

(54) SMARTER TRAFFIC SIGNS

(71) Applicant: International Business Machines Corporation, Armonk, NY (US)

(72) Inventor: Izzet Safer, Toronto (CA)

(73) Assignee: International Business Machines Corporation, Armonk, NY (US)

(*) Notice: Subject to any disclaimer, the term of this patent is extended or adjusted under 35 U.S.C. 154(b) by 189 days.

(21) Appl. No.: 14/703,029

(22) Filed: May 4, 2015

(65) Prior Publication Data

US 2016/0328965 A1    Nov. 10, 2016

(51) Int. Cl.
*G08G 1/14* (2006.01)
*G08G 1/09* (2006.01)
*G08G 1/0967* (2006.01)

(52) U.S. Cl.
CPC .............. *G08G 1/09* (2013.01); *G08G 1/0967* (2013.01)

(58) Field of Classification Search
CPC ................................................... G08G 1/0967
See application file for complete search history.

(56) References Cited

U.S. PATENT DOCUMENTS

| | | | | |
|---|---|---|---|---|
| 5,852,243 A * | 12/1998 | Chang | ................. | B60R 16/0237 340/580 |
| 9,202,376 B1 * | 12/2015 | Evans | .................... | G08G 1/149 |
| 2009/0140889 A1 * | 6/2009 | Mohaupt | ............... | G08G 1/0969 340/995.13 |
| 2011/0140927 A1 * | 6/2011 | Lee | .......................... | G08G 1/207 340/993 |
| 2011/0199235 A1 * | 8/2011 | John | ......................... | G08G 1/14 340/932.2 |

(Continued)

FOREIGN PATENT DOCUMENTS

| EP | 2320405 A1 | 5/2011 |
|---|---|---|
| EP | 2162770 B1 | 8/2012 |

(Continued)

OTHER PUBLICATIONS

IBM et al, Roving Transponder Method for Securely Programming a Distributed Collection of Changeable Units, Apr. 2, 2004, IPCOM000024642D, ip.com.

(Continued)

*Primary Examiner* — Brent Swarthout
(74) *Attorney, Agent, or Firm* — Patrick J. Daugherty; Driggs, Hogg, Daugherty & Del Zoppo Co., LPA

(57) ABSTRACT

Aspects identify different, mutually exclusive actions that each apply to usage of a roadway during occurrences of different respective associated combinations of temporal and road condition values. Current temporal data and combination road condition values that are associated with the mutually exclusive actions are determined. An active electronic display of a traffic sign device is driven to indicate one of the mutually exclusive actions as an active traffic requirement as a function of an association of the combination of the determined temporal and road condition values with the action, and to indicate a time or road condition value that differs from a respective one of the combination of the determined temporal and road condition values that are associated with the action as relevant to triggering application instead of another, different one of the mutually exclusive actions as the active traffic requirement.

17 Claims, 4 Drawing Sheets

(56) References Cited

U.S. PATENT DOCUMENTS

2013/0179007 A1\* 7/2013 Dalum ............... H01M 16/006
                                                                               701/2

FOREIGN PATENT DOCUMENTS

| EP | 2257939 B1 | 12/2012 |
| KR | 1020130021123 A | 3/2013 |
| WO | WO 2005/056926 A1 | 6/2005 |

OTHER PUBLICATIONS

X. W. Gao et al, Recognition of Traffic Signs Based on Their Colour and Shape Features Extracted Using Human Vision Models, Aug. 2006, Elsevier, Inc.

\* cited by examiner

SMARTER TRAFFIC SIGNS

BACKGROUND

Traffic signs are commonly used to convey road use regulations and road current conditions for vehicles (including automobiles or "cars"), bicyclists, pedestrians, etc. Fixed, printed traffic signs are frequently posted to define exceptions to default regulations and usage of roadways, for example to allow or prohibit parking on certain roadways, or turning left or right in certain areas to control traffic flow, or create an exception to current laws (such as preventing "right turns on red" at a certain intersection that would otherwise be permitted by applicable traffic laws). Often such signs include additional conditions that must be met in order for the communicated restrictions and usage rules to apply, such as prohibiting parking or requiring payment to parking meter devices only during specified time periods (hours of the day or days of the month or week), restricting parking during the occurrence of certain conditions (for example, prohibiting parking when snow fall accumulation exceeds two inches), or changing one way or two-way traffic allocations based on time of day (for example, during posted rush hours only).

Active signs may change messages displayed thereon via direct programming by operators or automated applications, or in response to timed programs, for example to automatically invert direction marker during rush hour times within a large city. Active signs may include electronic displays that use a variety of technologies, including illuminated liquid crystal display (LCD), light emitting diode (LED), video projection and monitor displays, and non-illuminated electronic ink displays that rely on natural or external light sources for illumination. Active signs may revise information content displayed to a car driver to convey different traffic rules, estimated commuting times and traffic detours and disruptions.

BRIEF SUMMARY

In one aspect of the present invention, a method dynamically selects a currently effective one of mutually exclusive roadway actions as a function of matching multiple, different time and condition requirements, and determines and displays an action advisory as a function of the selected directive. The method includes identifying a plurality of different, mutually exclusive actions that each apply to usage of a roadway during occurrences of different respective associated combinations of temporal values and road condition values. Current temporal data values are determined that are relevant combination temporal values associated with the mutually exclusive actions. Values of current roadway condition relevant to combination road condition values associated with the mutually exclusive actions are also determined. An active electronic display of a traffic sign device is driven to indicate one of the mutually exclusive actions as an active traffic requirement as a function of an association of the combination of the determined temporal and road condition values with the action, and to indicate a time or road condition value that differs from a respective one of the combination of the determined temporal and road condition values that are associated with the action as relevant to triggering application instead of another, different one of the mutually exclusive actions as the active traffic requirement.

In another aspect, a method provides a service for dynamically selecting a currently effective one of mutually exclusive roadway actions as a function of matching multiple, different time and condition requirements, and determining and displaying an action advisory as a function of the selected directive. The method includes integrating computer-readable program code into a computer system including a hardware processor in circuit communication with computer readable memory and a computer readable hardware storage device. The computer readable program code includes instructions for execution by the processor that cause the processor to identify a plurality of different, mutually exclusive actions that each apply to usage of a roadway during occurrences of different respective associated combinations of temporal values and road condition values. Current temporal data values are determined that are relevant combination temporal values associated with the mutually exclusive actions. Values of current roadway condition relevant to combination road condition values associated with the mutually exclusive actions are also determined. An active electronic display of a traffic sign device is driven to indicate one of the mutually exclusive actions as an active traffic requirement as a function of an association of the combination of the determined temporal and road condition values with the action, and to indicate a time or road condition value that differs from a respective one of the combination of the determined temporal and road condition values that are associated with the action as relevant to triggering application instead of another, different one of the mutually exclusive actions as the active traffic requirement.

In another aspect, a system has a hardware processor in circuit communication with a computer readable memory and a computer-readable storage medium having program instructions stored thereon. The processor executes the program instructions stored on the computer-readable storage medium via the computer readable memory and thereby identifies a plurality of different, mutually exclusive actions that each apply to usage of a roadway during occurrences of different respective associated combinations of temporal values and road condition values. Current temporal data values are determined that are relevant combination temporal values associated with the mutually exclusive actions. Values of current roadway conditions relevant to combination road condition values associated with the mutually exclusive actions are also determined. An active electronic display of a traffic sign device is driven to indicate one of the mutually exclusive actions as an active traffic requirement as a function of an association of the combination of the determined temporal and road condition values with the action, and to indicate a time or road condition value that differs from a respective one of the combination of the determined temporal and road condition values that are associated with the action as relevant to triggering application instead of another, different one of the mutually exclusive actions as the active traffic requirement.

In another aspect, a computer program product is provided for dynamically selecting a currently effective one of mutually exclusive roadway actions as a function of matching multiple, different time and condition requirements, and determining and displaying an action advisory as a function of the selected directive. The computer program product has a computer-readable storage medium with computer readable program code embodied therewith. The computer readable program code includes instructions for execution which cause the processor to identify a plurality of different, mutually exclusive actions that each apply to usage of a roadway during occurrences of different respective associated combinations of temporal values and road condition values. Current temporal data values are determined that are relevant combination temporal values associated with the mutually exclusive actions. Values of current roadway condition relevant to combination road condition values associated with the mutually exclusive actions are also determined. An active electronic display of a traffic sign device is driven to indicate one of the mutually exclusive actions as an active traffic requirement as a function of an association of the combination of the determined temporal and road condition values with the action, and to indicate a time or road condition value that differs from a respective one of the combination of the determined temporal and road condition values that are associated with the action as relevant to triggering application instead of another, different one of the mutually exclusive actions as the active traffic requirement.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
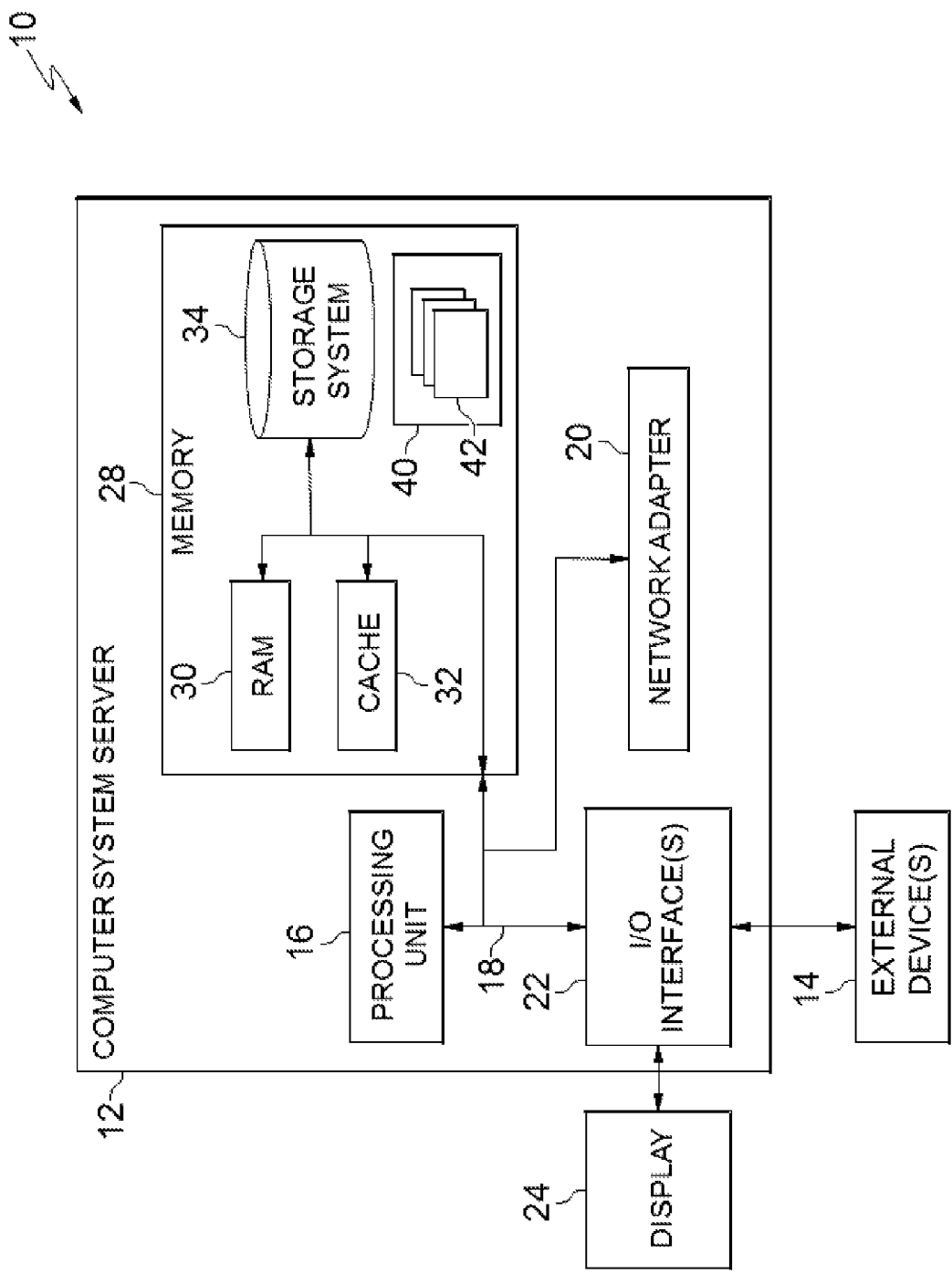
FIG. 1 depicts a cloud computing node according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
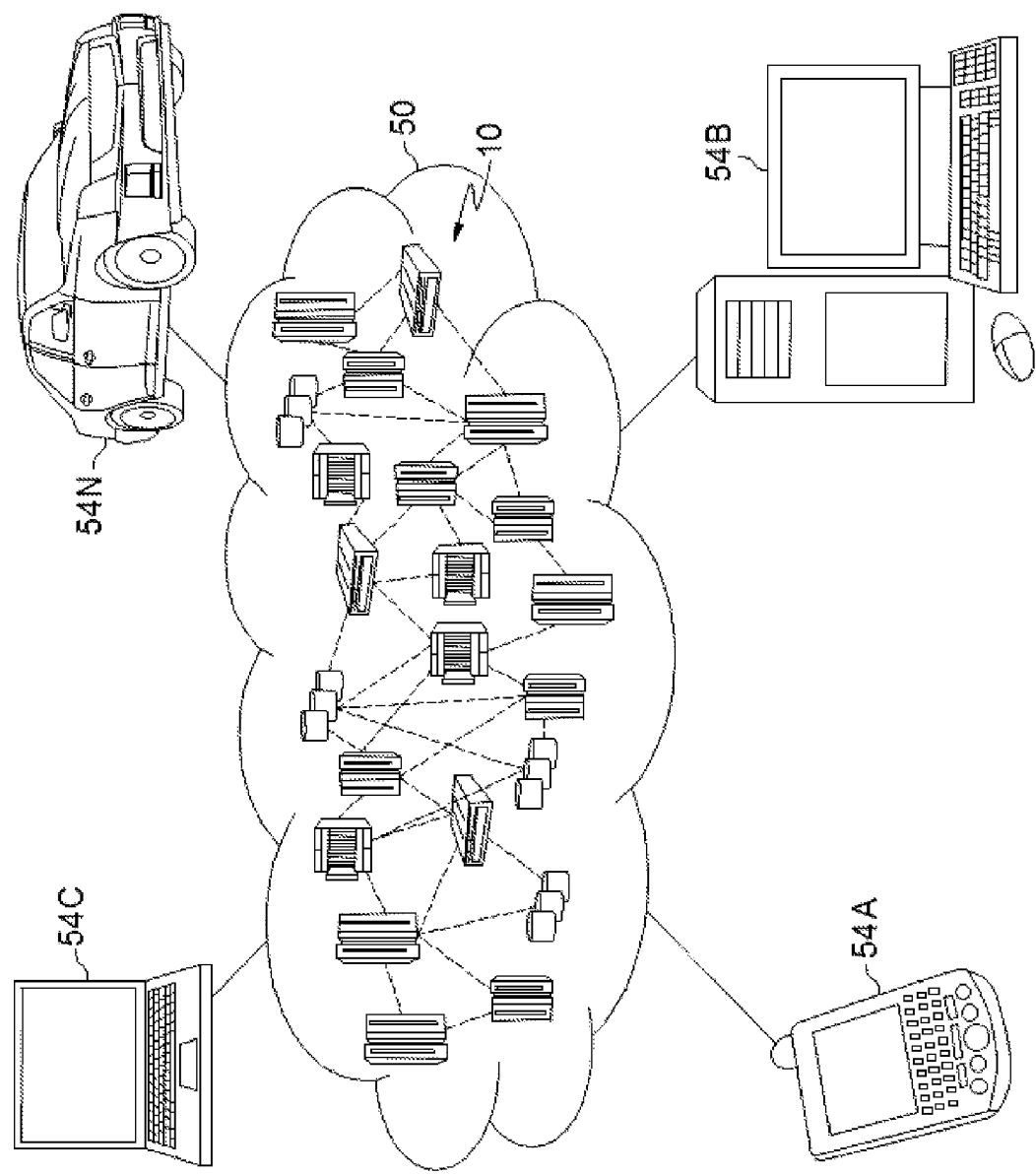
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
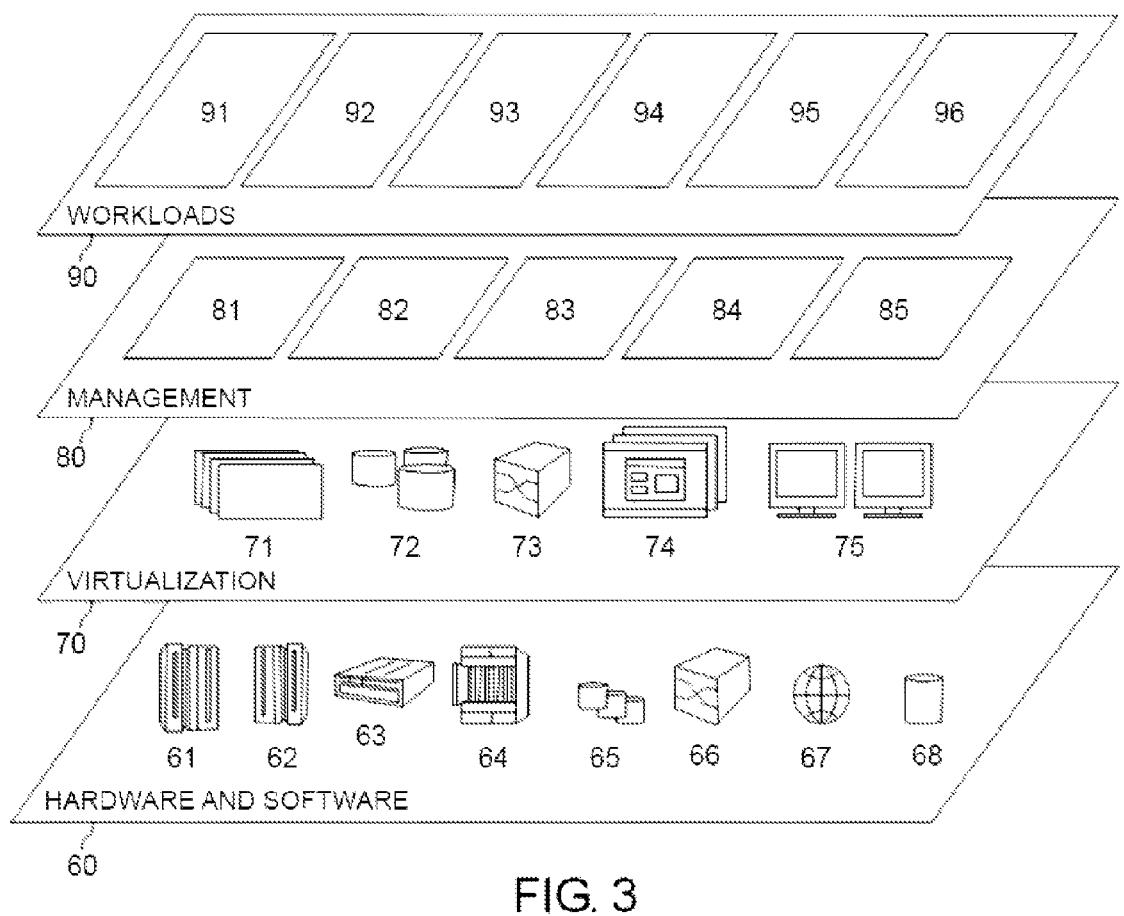
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processes 96 according to the present invention for dynamically selecting a currently effective one of mutually exclusive roadway actions as a function of matching multiple, different time and condition requirements, and determining and displaying an action advisory as a function of the selected directive, as discussed with more particularity below.

In one aspect, a service provider may perform process steps of the invention on a subscription, advertising, and/or fee basis. That is, a service provider could offer to integrate computer readable program code into the computer system/server 12 to enable the computer system/server 12 to perform process steps of the invention. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 12, from a tangible computer readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

There are many different kinds of traffic signs utilized on roads to define usage actions that include rules and regulations applicable to vehicle operators, pedestrians, etc. Common applications include signs conveying information with regard to allowing or prohibiting parking and turning left or right, etc. Such signs may utilize a wide variety of fonts and colors to convey information via lettering and numbering in passive, fixed and reflective formats as well as via active, device-driven electronic character displays.

Often such signs convey permissions and restrictions on parking or turning, etc., that require additional criteria that must be understood and used by a person in order to determine an appropriate responsive action by a vehicle operator or other person. For example, printed signs often convey parking restriction, permission or payment requirements that depend on an hour of the day, day of the month, or the occurrence of some other temporary event (special public assembly event, road construction work being performed or project in progress, etc.). Thus, in order to comply with or otherwise apply the conveyed information the person must ascertain additional information outside of that posted on the sign to determine whether or not one or more of posted parking restriction currently apply to the driver. For example, one must consult a timepiece or calendar to determine whether the restriction applies at the current time, or to accurately identify a span of time (time period) into the future of a duration of a driver's actions, such as how long they intend to park a car within an area that is subject to parking restrictions posted on applicable signage. If the driver intends to park his or her car now, and/or for a period extending past a certain time (such as overnight), the driver must determine whether or not the posted parking restrictions allow parking at the time of parking, as well as throughout the coming night hours, and whether any parking fees are due if parking is permitted, and in what amount, and how to pay them, etc. Further, the rules and regulations may have additional conditions or predicates, such as permit or residency status of a vehicle or vehicle owner, wherein some signage parking directions may only apply to residents or permit holders.

Figure 4:
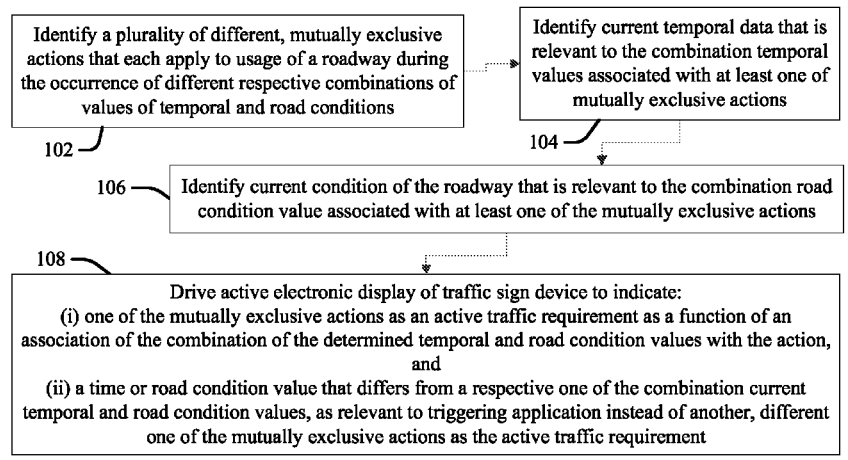
FIG. 4 is a flow chart illustration of a method or process layers for dynamically selecting a currently effective one of mutually exclusive roadway actions as a function of matching multiple, different time and condition requirements, and displaying an action advisory as a function of the selected directive according to an embodiment of the present invention.

FIG. 4 (or "FIG. 4") illustrates a computer implemented method or process of an aspect of the present invention wherein a processor (for example, a central processing unit (CPU)) within a programmable ("smart") traffic sign device (hereinafter sometimes simply the "sign") executes code (for example, code installed on a storage device in communication with the processor). The processor thereby dynamically selects a currently effective one of mutually exclusive roadway actions as a function of matching multiple (two or more) different time and condition requirements (or condition predicates) that are associated with respective ones of the actions, and determines and displays an action advisory with respect to a roadway as a function of the selected directive to a vehicle driver or other person. "Roadway" will be understood to comprehend any area that a vehicle may use or engage, including roads, driveways, parking spaces, specific lanes within a multilane road, etc. Operators of vehicles using the roadway may sometimes be referred to as "car drivers."

At 102 a plurality of different, mutually exclusive actions are identified that each apply to usage of the roadway during the occurrence of different respective combinations of temporal values and road condition values. Each of the actions are possible but opposite and mutually exclusive with respect to at least one other of the actions, such as allowing or prohibiting parking, allowing or prohibiting driving through a lane in a certain specified direction or in the opposite direction, allowing or prohibiting turns in a specified direction, allowing or prohibiting stopping, etc. Each is associated with a unique combinations of the temporal values (date, day and/or time) and road condition values (level of traffic congestion, road surface under construction, or having accumulated snow or icy surfaces, etc.) that differs from the combinations of all other possible and relatively mutually exclusive actions.

At 104 current temporal data is determined that is relevant to the combination temporal values associated with at least one of the mutually exclusive actions. The temporal data is determined within a precision or tolerance of associated with said at least one mutually exclusive action, including values of time in hours, day of week and/or date of the year that are relevant to the to the combination temporal values associated with said at least one mutually exclusive action. For example, if parking meter fees are only required on a road during weekdays, the current temporal data identified at 104 is determination if the current day is a weekday (Monday through Friday inclusive) or is instead Saturday or Sunday. If the parking meter fees are further conditional on certain hours during weekdays (for example, between 8:00 A.M. and 6 P.M.), then the current temporal data identified at 104 comprises a determination if the current the time of day is within or without the specified hour range. If the action is associated with a season, such as winter months, the current temporal data identified at 104 comprises a determination as to a date of year value. Thus, association of the combination determined temporal data value with an action may include determining whether one or more of determined current time values in hours, day of week values and date of year values fall within respective ranges of values associated one, selected mutually exclusive action, as described below.

At 106 a current condition of the roadway is determined that is relevant to the combination road condition values associated with the at least one mutually exclusive action. Current determined road conditions may include current weather or weather forecasts. Some of the combination road condition requirements associated with parking ban actions may be threshold amounts of snowfall accumulations or predicted accumulations of a future time period (for example, totals within the next 24 hours), wherein parking is banned at all time in order to enable plowing of the road to clear the snow and facilitate travel by vehicles, and is otherwise allowed during certain temporal periods specified by the combination temporal values associated with one or more of the mutually exclusive actions.

Observations or predictions of icy road conditions may also be included within the combination road condition requirements to trigger actions to reduce posted speed limits, in some instances for only certain classes of vehicles (for example, for tandem axle vehicles or those over a specified gross weight capacity) but not for others; or for only certain portions of a roadway, such as over bridges and elevated streets wherein street surfaces are more prone to freezing, or freeze more quickly, relative to portions that include non-elevated street surfaces.

Current determined road conditions may include identifying traffic congestion (via real-time roadway monitoring), and scheduled road construction projects, detours or other disruptions to the normal carrying capacity of the roadway. Special event venues nearby with large anticipated occupancy that are served or proximate to the roadway, such as stadiums or arenas with scheduled sporting, entertainment, speaking or other large public assembly events may increase traffic loading, requiring parking bans for time periods during and about the times of the events that are independent and different from time and date criteria (temporal values) normally used to distinguish different parking permissions or fees.

Identifying traffic congestion may encompass observing and implementing rush hour traffic management, which may include parking and stopping bans, as well as changes to permissions for lane usage, that supersede other temporal or road conditional values associated with the pairs of mutually exclusive actions. In some examples the specified or legal direction of travel within a specified lane may reverse during rush hours, toward a direction to enable the associated and time-dependent greater flows of vehicles (toward the city center in the morning, at the beginning of the work day, or away from the city center in the late afternoon, at the end of the work day). Such lane reversals may also be used at the beginning or end of large assembly events, superseding the normal rush hours and non-rush hour determinations for each of a pair of mutually exclusive lane direction specification actions.

At 108, as a function of an associated combination of temporal and road condition values matching the current temporal data values determined at 104 and the current roadway condition data values determined at 106, an active electronic display of the traffic sign device is driven to indicate: (i) a first one of the mutually exclusive actions as an active traffic requirement as a function of an association of the combination of the determined temporal and road condition values with the first action, and (ii) a time or road condition value that differs from a respective one of the combination of the determined temporal and road condition values as relevant to triggering application instead of another, different one of the mutually exclusive actions as the active traffic requirement.

Display of the selected action applicable to the current temporal and roadway condition data as the active traffic requirement at 108 may include translation into an executable directive for display to a person that directly informs the person of what they must do to comply with the selected action. Thus, the person need not read and understand or otherwise process the different rule and regulations displayed on a sign to determine which of mutely exclusive actions they may take (for example, "can I park or not, based on time of day, snowfall, etc.?"), but instead the sign directly informs the person what they can do right now (for example, "Parking Allowed" for this current time or "No Parking without permit" instead for this same, current time).

For example, in the prior art the train of thought required by a driver to correctly interpret the information conveyed by traffic signs and take actions accordingly may be complex and confusing. In one example the driver must: (1) read and understand the type of the sign (for example, parking allowed, parking prohibited, turning right allowed, turning right prohibited, etc.); (2) read and decode the temporal criteria on the sign (to determine that parking restrictions apply or do not apply between 7:00 A.M. and 11:00 P.M., between Monday and Friday, every day except weekends and holidays, etc.); (3) determine the current and/or future applicable time period ("What time is it now? Or will it be tomorrow when the car is still parked? Does today or tomorrow fall within a normal week day, or a weekend or holiday?" "Which holidays are recognized as a holiday, and is today or tomorrow one of them?"); (4) determine if they have the requisite status for application of the printed rules or regulations ("Does my vehicle need a permit displayed, and if so which one? Does it apply to me as a resident or as a non-resident?"); (5) decide if it the action can be taken (for example, "Yes or No?, to the query of "can I park here?" when it's 10 A.M. on a Tuesday and the sign allows all parking between 7:00 A.M. and 11:00 P.M. on week days, and otherwise requires display of a specified parking permit; and, lastly, (6) take an appropriate action accordingly, for example, not parking here today until after 9 AM, and ensuring that a specified permit is valid and displayed.

In contrast, aspects of the present invention execute some if not all of the determination processes required under the prior art at (1) through (5) listed above directly for the person, and display a resulting appropriate action at 108 that is selected from a universe of the plurality of mutually exclusive actions.

Some aspects consider three or more different temporal or road condition inputs to select between the mutually exclusive actions. In one example the process determines whether or not parking is currently allowed on a designated on snow lane in response to determining each of three different temporal and road condition data items: (i) whether a time in hours of the determined current temporal data is within a specified range of hours, such as between 1:00 AM and 6:00 AM, indicating an overnight parking use; (ii) whether the date of the determined current temporal data is within a specified range of dates indicating it is during the winter season, for example, between December 15$^{th}$ and March 31$^{st}$, or during a specified month; and (iii) whether the determined current road conditions indicate at least 3 inches of accumulated snow over the last 24 hours, or is predicted to occur within 24 hour time frame including the current time, which triggers a snow ban on parking but only during the winter season as determined at (ii).

In another example the process determines whether or not a special event "no parking" directive is in effect in response to determining each of another set of three different associated temporal and road condition data items: (i) identifying whether an event scheduled on a calendar database meets criteria for a "special event," for example will take place at a facility with a large occupancy, or has a minimum expected occupancy or associated traffic flow or parking demand based on advance ticket sales or historic data for similar event, such as a concert, speaker or sporting event, etc. (ii) If said scheduled event meets the special event criteria at (i), the process determines whether the occurrence time, estimated duration of traffic and parking impacts and date of the event match the current time period in hours, day and/or date. If (i) and (ii) are met, at (iii) the process determines if the portion of the roadway that the sign applies to is close enough to the event venue to trigger an associated "No Parking-Special Event" action of a pair of parking allowed-no parking actions. The determination at (iii) may be based on location within a designated neighborhood or predefined or determined impact area including the event location. It may also be dynamically based on a metric of traffic flow or parking impact determined for the event, for example, based on an impact radius from the event facility location that increases in length in proportion to estimated actual or projected occupancy. Thus, a smaller event impact radius from a given facility may be determined for a small occupancy event that does not encompass the street portion controlled by the sign and therefore not trigger the parking restriction at (iii), but wherein a larger occupancy event scheduled for the same facility results in a proportionately larger radius that encompasses the street portion and thereby triggers the restriction action at (iii).

In another example the process manages competing flows of vehicular and bicycle traffic on a shared lane resource via an active right of way signage in response to determining another set of different associated temporal and road condition data items. For example, (i) determining whether current temporal data is within a designated high-traffic rush hour, such as between 6:00 AM-9:00 AM or 4:00 PM-7 PM, on Monday-Friday inclusive. The aspect further (ii) determines whether the date of the current temporal data falls within a season of the year for the current region that historically experiences a low demand for use of the shared lane by bicyclists relative to vehicle traffic flow, for example winter months in areas that generally experience high amounts of snowfall. Thus, an active sign may be driven (at 108, FIG. 4) to select and display "Cyclists Yield to Automobiles" during rush hour times, as well as outside of rush hour times during the winter, in order to enable efficient vehicle flow and avoid traffic flow impediments caused by slower-moving bicyclists, and to display instead "Yield to Cyclists in Curb Lane" outside of the rush hours times during the non-winter season.

In an alternative aspect the active sign may be driven to instead select and display "Yield to Cyclists in Shared Lane" during the rush hour times and during the non-winter season, in recognition that traffic flow speeds will be slower and thus better able to accommodate slower-moving bicyclists, and/or in order to encourage bicycle commuting over vehicle commuting during rush hour in implementing a public policy to reduce vehicle traffic during rush hour. The motivation for this sign choice may be a policy recognizing that cyclists don't slow down traffic in rush hour times, as speeds are already limited by the heavy traffic flow, and therefore cyclists may be more safely given right of way under non-winter conditions. In this example the sign may be driven to display (at 108, FIG. 4) "Cyclists Yield to Automobiles" at non-rush hour times during non-winter season, and at all times during the winter season, to enhance safe usage of the road during low vehicular or bicycle traffic loading, which may indicate that a bicyclist is less likely to match vehicle traffic flow speeds, thereby causing a heightened risk of injury to bicyclists from vehicle collisions that is reduced by requiring the cyclist to yield to vehicles within the shared lane.

Aspects also use active sign messaging to dynamically manage the direction of flow on multilane road lanes that remain open during the closures of other lanes, for example on a two-way traffic multilane road that is reduced to one lane leaving only one way traffic available. The lane direction determination may be based on the determination of multiple, different associated temporal and road condition data items, including: (i) whether current temporal data time of day in hours matches planned maintenance or construction hours; (ii) whether current temporal data day of week or date matches maintenance or construction days planned, scheduled or currently indicated as active; and (iii) matching the indicated direction to serve anticipated or actual traffic flow needs, for example selecting one direction during an entire rush hour period to serve the direction of an anticipated higher traffic flow demand (away from the city at the end of the day, etc.), or to alternate between directions on a periodic basis along with a traffic signal, wherein the periods may be even, or uneven to bias toward serving heavier anticipated or actual flows in one of the directions.

Figure 5:
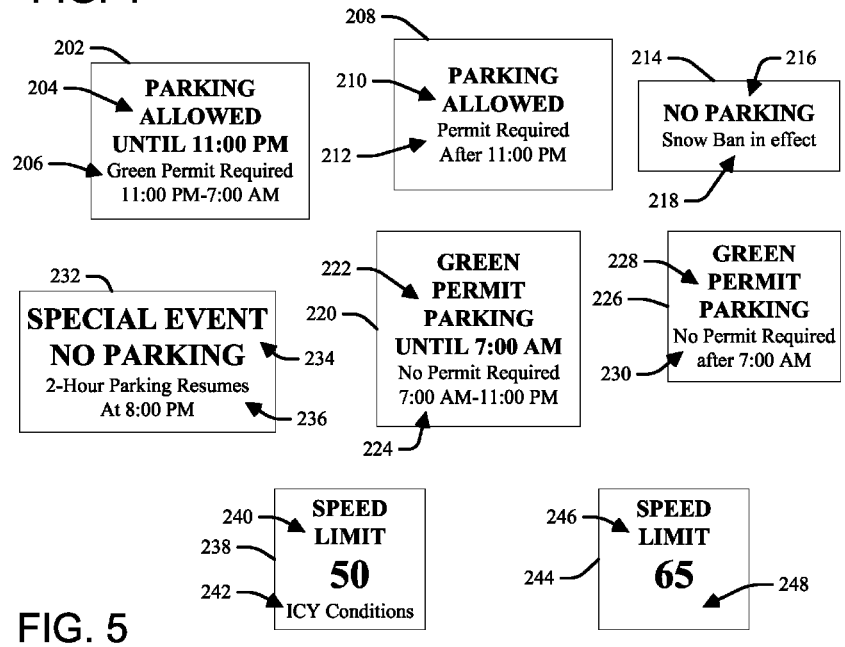
FIG. 5 provides graphic illustrations of examples of active sign displays according to embodiments of the present invention.

Elements 202, 208, 214, 220, 226 and 232 of FIG. 5 illustrate different examples of active electronic displays on the same traffic sign device according to the present invention that executes the process of FIG. 4 and chooses between and displays different mutually exclusive action information relative to no parking, parking allowed for all, or parking only for permit holders, as a function of current temporal data (time of day in hours, day of the week) and road condition data (accumulated snowfall total or occurrence of a special event impacting traffic flow).

Thus, in response to determining that the temporal and road condition data match a combination for allowing general parking ((i) temporal time of day in hours is between 7:00 AM and 11:00 PM, (ii) the accumulated snowfall total is less than two inches and (iii) no special event is occurring over a time frame including the current temporal time, the active electronic display 202 informs vehicle operators via a first dominant/active action sign display area 204 that general parking is currently allowed without permit, and also indicates when this active action ends: "PARKING ALLOWED UNTIL 11:00 PM." A driver need not read the plurality of different rules and regulations appearing on a conventional sign and determine how they apply to him based on current time of day and weather or road conditions and season, but instead an automated sign device according to the present invention determines for the person that current temporal and road conditions data fall within the conditions associated with currently allowing parking, and the active display of the sign is accordingly driven to directly inform the driver of the correct decision result: "yes, you can park here now." The active action directive display 204 further informs the driver when this permission will end in the future, at 11:00 PM, enabling the driver to decide how long into the future he or she may use the parking opportunity.

A second, non-dominant/inactive action sign display area 206 informs readers of the time or road condition that differs from the determined current temporal and/or roadway condition and that is relevant to triggering (or will trigger) application instead of another, different one of the plurality mutually exclusive actions: "Green Permit Required 11:00 PM-7:00 AM." Thus, the driver knows that after 11:00 PM, and through 7:00 AM parking, is allowed only for those who display a green parking permit, and may plan accordingly if they park and may leave the vehicle parked after 11:00 PM.

Some aspects visually distinguish the active action or associated directive display within the dominant/active action area 204 from the secondary/inactive action area information display 206 of the time or road condition that differs from the determined current temporal and/or roadway condition and that is relevant to triggering (or triggers) application instead of another, different mutually exclusive action. In the present example the dominant/active action area 204 is rendered in a bold face and with a larger font, relative to the smaller and non-bold face font used to render the secondary/inactive action display area 206 information. Thus, the difference in emphasis readily conveys that the information rendered in non-bold, smaller font in the secondary/inactive action area 206 is not currently applicable to the action of the person reading the sign and parking a car, while still giving that person information he or she needs for future planning (thus, to make sure they plan on moving the vehicle prior to 11:00 PM if they do not have a valid permit). Aspects may use different colors, fonts, font sizes, periodicity of flashing lights (including flashing versus non-flashing lights), formatting styles or other distinctive approaches to distinguish the active ones of the mutually exclusive paired actions from the other, inactive action, or distinguishing temporal or road condition data associated with the active or inactive paired action. This enables the sign information to be quickly and clearly conveyed to and understood by a person reading the sign, so that person may quickly take an appropriate action without having to decode and apply differentiating condition predicates.

Display 208 offers a more direct and simplified display of active action information within the first dominant/active action sign display area 210 for the determinations and actions selections described above with respect to display 202, simply informing a person that general parking is currently allowed "PARKING ALLOWED," and omitting the condition predicate that ends this current action or directive (11:00 PM). The secondary/inactive action area information display 212 also provides notice of the temporal condition ("After 11:00 PM") that triggers another, mutually exclusive action that is more general as to the type of permit required to park ("Permit Required").

Display 220 is driven in response to a different value returned for the determinations executed with respect to the displays 202 and 208, wherein the (i) determined temporal time of day in hours is instead between 11:00 PM and 7:00 AM. The other values remain the same: (ii) the accumulated snowfall total is less than two inches and (iii) no special event is occurring over a time frame including the current temporal time. Accordingly, the first dominant/active action sign display area 222 within the sign now informs a reader that parking currently requires a green permit, and the time at which this temporal condition ends (7:00 AM). The non-dominant/inactive action sign display area 224 informs readers of the action ("No permit required") that differs from the action applicable to current determined combination of temporal and road conditions, when this different action is triggered (after 7:00 AM) and further conveys the duration into the future of this different action ("7:00 AM-11:00 PM").

Display 226 offers a more direct and simplified display of active action information within the first dominant/active action sign display area 228 that matches the combination of the determined current temporal and road condition values as described above with respect to display 220, simply informing a person that parking with a green permit is currently allowed, and omitting the condition predicate that ends this current action or directive (7:00 AM). The secondary/inactive action area information display 230 instead provides sole notice of the temporal condition ("after 7:00 AM") that triggers another, mutually exclusive action that is more general as to the type of permit required to park ("No Permit Required").

Display 214 is driven in response to determining that (ii) a value of accumulated snowfall total is equal to or greater than two inches. Accordingly, the first dominant/active action sign display area 216 within the sign now informs a reader that no parking is currently allowed, regardless of permit ("No Parking"). The non-dominant/inactive action sign display area 218 informs one of the road condition ("Snow Ban in effect") that triggers the selection of the dominant action displayed in 216, and indirectly conveys to the reader that the end of said road condition value will also end application of the active action: that the "no parking" action is only effective while the "snow ban" condition is active, and that this will end when the value of the road condition predicate ends (the accumulation value drops below a threshold total, or a time period associated with the total snowfall threshold expires).

Display 232 is driven in response to determining that (iii) a special event is occurring over the time frame including the current temporal time. Accordingly, the first dominant/active action sign display area 234 within the sign now informs a reader that no parking is currently allowed, regardless of permit, due to the occurrence of a special event ("Special Event No Parking"). The non-dominant/inactive action sign display area 236 informs readers of the condition that triggers the end of the current ban on parking, and the type of parking that will be allowed upon the occurrence of that temporal condition value occurrence ("2-Hour Parking Resumes At 8:00 PM").

Sign display 238 of FIG. 5 illustrates an active speed limit sign according to an aspect of the present invention, wherein the first dominant/active action sign display area 240 uses a conventional type of font and size to convey the current speed limit of "50." The non-dominant/inactive action sign display area 242 informs readers the road condition predicate ("ICY Conditions") that both triggers the selection of the dominant action speed limit value displayed in 240, and indirectly conveys to the reader the condition that will end application of the active action: that the current speed limit value of "50" is effective while the icy road conditions are extant, and will end when the icy conditions end.

Display 244 is driven on the same sign used to drive the display 238, but wherein the icy conditions have ended and a different, normal conditions speed limit of "65" is now conveyed in the active area 246. In this aspect information with regard to the end of the "icy" road condition value predicate is conveyed via a non-display of the condition in the secondary/inactive area 248. In one respect there is no need to state that road conditions are not icy, it is implied by omitting the conveyance of any information within the inactive area 248, improving readability and comprehension of the information within the road sign display 244 considered in gross.

Aspects of the present invention improve active traffic sign technologies by providing solutions and advantages in overcoming time and effort inefficiencies in the responsive decision processes required by drivers under prior art traffic signage system teachings to decode traffic signs and take appropriate actions. Aspects reduce confusion, delays, and illegal operator behaviors, such as parking violations, blocking traffic or increasing congestion by disregarding rush hour or other special event restrictions, which would otherwise be caused by vehicle operators making erroneous determinations and applications of the different, competing and mutually exclusive actions that may be presented within a prior art sign. Aspects advance the goals of smarter traffic management for a given area, by reducing the frequency of traffic sign violations via improved communications of the appropriate traffic rule and restrictions, in a dynamic fashion. They also reduce the risk of exposure of sign users to the financial repercussions of violating said rule and restrictions that would otherwise results in fines or traffic tickets, moving violation citations, driver's license demerit points, etc., for drivers, that accrue from misunderstanding requirements conveyed by prior art signage.

However, it will be understood that some embodiments may not have some or all of potential advantages described herein, and that said potential advantages are not necessarily required of all embodiments.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamically selecting a currently effective one of mutually exclusive roadway actions as a function of matching multiple, different time and condition requirements, and determining and displaying an action advisory as a function of the selected directive, the method comprising executing on a computer processor the steps of:

identifying a plurality of different, mutually exclusive actions that each apply to usage of a roadway during occurrences of different respective associated combinations of temporal values and road condition values;

determining a current temporal data value that is relevant to at least one combination temporal value that is associated with at least one of the mutually exclusive actions;

determining a current condition of the roadway value that is relevant to at least one combination road condition value that is associated with at least one of the mutually exclusive actions;

driving an active electronic display of a traffic sign device to indicate a first of the mutually exclusive actions as an active traffic requirement as a function of an association of the combination of the determined temporal and road condition values with the first action; and driving the active electronic display of the traffic sign device to indicate a time or road condition value that differs from a respective one of the combination of the determined temporal and road condition values that are associated with the first action as relevant to triggering application instead of another, different one of the mutually exclusive actions as the active traffic requirement; and wherein the step of driving the active electronic display to indicate the first of the mutually exclusive actions as the active traffic requirement comprises:

driving the active electronic display to indicate a "parking is allowed" action of the mutually exclusive roadway actions in response to matching the current temporal data value to a specified range of temporal values of the combination determined temporal values that are associated with the "parking is allowed" action, determining that an accumulated snowfall total value of the current road condition value is less than a threshold accumulated snowfall total value of the combination determined road condition values that are associated with the "parking is allowed" action, and determining that the current temporal data value does not match a special event temporal value of the combination determined road condition values that is associated with the "parking is allowed" action; and driving the active electronic display to indicate a "no parking" action of the mutually exclusive roadway actions in response to determining that the current temporal data value matches another specified range of temporal values of the combination determined temporal values that are associated with the "no parking" action, determining that the accumulated snowfall total value of the determined road condition value is more than a threshold accumulated snowfall total value of the combination determined road condition values that are associated with the "no parking" action, or determining that the current temporal data value matches another special event temporal value of the combination determined road condition values that is associated with the "no parking" action.

2. The method of claim 1, further comprising:

integrating computer-readable program code into a computer system comprising the processor performing the steps, a computer readable memory in circuit communication with the processor, and a computer readable storage medium in circuit communication with the processor; and wherein the processor executes program code instructions stored on the computer-readable storage medium via the computer readable memory and thereby performs the steps of identifying the plurality of different, mutually exclusive actions, determining the current temporal data value, determining the current condition of the roadway value, driving the active electronic display to indicate the first of the mutually exclusive actions as the active traffic requirement, and driving the active electronic display to indicate the time or road condition value that differs from the respective one of the combination of the determined temporal and road condition values that are associated with the first action.

3. The method of claim 1, wherein the step of determining the current temporal data value comprises determining a current time value in hours, day of week value and date of year value; and wherein the association of the combination determined temporal data value with the first action comprises determining that the determined current time value falls within a range of values that is associated with said mutually exclusive action and is selected from the group consisting of a specified range of hours, a specified range of day of week values and a specified range of date of year values.

4. The method of claim 3, wherein the association of the combination determined temporal data value with the first action comprises matching at least three different determined temporal and road condition data values to respective values associated with the first action that are selected from a group consisting of the specified range of hours, the specified range of dates, a threshold amount of accumulated snow, a scheduled date of a special event, and a location of the road within an impact area defined for the special event.

5. The method of claim 4, further comprising:

determining that the location of the road is within the impact area defined for the special event in response to determining that the location of the road is within an impact radius from a location of the special event; and determining a length of the impact radius in proportion to an estimated occupancy of the special event.

6. The method of claim 4, wherein the step of driving the active electronic display to indicate the first of the mutually exclusive actions as the active traffic requirement comprises visually distinguishing the indicated active traffic requirement from the indicated time or road condition value via use of an attribute that is selected from the group consisting of different font sizing, different styles, different coloring and different flashing light periodicities.

7. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

identifies a plurality of different, mutually exclusive actions that each apply to usage of a roadway during occurrences of different respective associated combinations of temporal values and road condition values;

determines a current temporal data value that is relevant to at least one combination temporal value that is associated with at least one of the mutually exclusive actions;

determines a current condition of the roadway value that is relevant to at least one combination road condition value that is associated with at least one of the mutually exclusive actions;

drives an active electronic display of a traffic sign device to indicate a first of the mutually exclusive actions as an active traffic requirement as a function of an association of the combination of the determined temporal and road condition values with the first action; and drives the active electronic display of the traffic sign device to indicate a time or road condition value that differs from a respective one of the combination of the determined temporal and road condition values that are associated with the first action as relevant to triggering application instead of another, different one of the mutually exclusive actions as the active traffic requirement; and wherein the processor drives the active electronic display to indicate the first of the mutually exclusive actions as the active traffic requirement by:

driving the active electronic display to indicate a "parking is allowed" action of the mutually exclusive roadway actions in response to matching the current temporal data value to a specified range of temporal values of the combination determined temporal values that are associated with the "parking is allowed" action, determining that an accumulated snowfall total value of the current road condition value is less than a threshold accumulated snowfall total value of the combination determined road condition values that are associated with the "parking is allowed" action, and determining that the current temporal data value does not match a special event temporal value of the combination determined road condition values that is associated with the "parking is allowed" action; and driving the active electronic display to indicate a "no parking" action of the mutually exclusive roadway actions in response to determining that the current temporal data value matches another specified range of temporal values of the combination determined temporal values that are associated with the "no parking" action, determining that the accumulated snowfall total value of the determined road condition value is more than a threshold accumulated snowfall total value of the combination determined road condition values that are associated with the "no parking" action, or determining that the current temporal data value matches another special event to temporal value of the combination determined road condition values that is associated with the "no parking" action.

8. The system of claim 7, wherein the processor executes the program instructions stored on the computer-readable storage medium via the computer readable memory and thereby further:
determines the current temporal data value by determining a current time value that is selected from the group consisting of hour values, day of week values and date of year values; and
associates the combination determined temporal data value with the first action by determining that the determined current time value falls within a range of values that is associated with said at least one mutually exclusive action.

9. The system of claim 8, wherein the processor executes the program instructions stored on the computer-readable storage medium via the computer readable memory and thereby further:
associates the combination determined temporal data value with the first action by matching at least three different determined temporal and road condition data values to respective values associated with the first action that are selected from a group consisting of the specified range of hours, the specified range of dates, a threshold amount of accumulated snow, a scheduled date of a special event, and a location of the road within an impact area defined for the special event.

10. The system of claim 9, wherein the processor executes the program instructions stored on the computer-readable storage medium via the computer readable memory and thereby further:
determines that the location of the road is within the impact area defined for the special event in response to determining that the location of the road is within an impact radius from a location of the special event; and
determines a length of the impact radius in proportion to an estimated occupancy of the special event.

11. The system of claim 9, wherein the processor executes the program instructions stored on the computer-readable storage medium via the computer readable memory and thereby further:
drives the active electronic display to visually distinguish the indicated active traffic requirement from the indicated time or road condition value via use of an attribute that is selected from the group consisting of different font sizing, different styles, different coloring and different flashing light periodicities.

12. The system of claim 9, wherein the program instructions executed by the processor is software provided as a service in a cloud environment.

13. A computer program product for dynamically selecting a currently effective one of mutually exclusive roadway actions as a function of matching multiple, different time and condition requirements, and determining and displaying an action advisory as a function of the selected directive, the computer program product comprising:

a computer readable hardware storage device having computer readable program code embodied therewith, wherein the computer readable hardware storage device is not a transitory signal per se, the computer readable program code comprising instructions for execution by a processor that cause the processor to:
identify a plurality of different, mutually exclusive actions that each apply to usage of a roadway during occurrences of different respective associated combinations of temporal values and road condition values;
determine a current temporal data value that is relevant to at least one combination temporal value that is associated with at least one of the mutually exclusive actions;
determine a current condition of the roadway value that is relevant to at least one combination road condition value that is associated with at least one of the mutually exclusive actions;
drive an active electronic display of a traffic sign device to indicate a first of the mutually exclusive actions as an active traffic requirement as a function of an association of the combination of the determined temporal and road condition values with the first action; and
drive the active electronic display of the traffic sign device to indicate a time or road condition value that differs from a respective one of the combination of the determined temporal and road condition values that are associated with the first action as relevant to triggering application instead of another, different one of the mutually exclusive actions as the active traffic requirement; and
wherein the computer readable program code comprises instructions for execution by the processor that cause the processor to drive the active electronic display to indicate the first of the mutually exclusive actions as the active traffic requirement by:
driving the active electronic display to indicate a "parking is allowed" action of the mutually exclusive roadway actions in response to matching the current temporal data value to a specified range of temporal values of the combination determined temporal values that are associated with the "parking is allowed" action, determining that an accumulated snowfall total value of the current road condition value is less than a threshold accumulated snowfall total value of the combination determined road condition values that are associated with the "parking is allowed" action, and determining that the current temporal data value does not match a special event temporal value of the combination determined road condition values that is associated with the "parking is allowed" action; and
driving the active electronic display to indicate a "no parking" action of the mutually exclusive roadway actions in response to determining that the current temporal data value matches another specified range of temporal values of the combination determined temporal values that are associated with the "no parking" action, determining that the accumulated snowfall total value of the determined road condition value is more than a threshold accumulated snowfall total value of the combination determined road condition values that are associated with the "no parking" action, or determining that the current temporal data value matches another special event temporal value of the combination determined road condition values that is associated with the "no parking" action.

14. The computer program product of claim 13, wherein the computer readable program code instructions for execution by the processor further cause the processor to:
   determine the current temporal data value by determining a current time value in hours, day of week value and date of year value; and
   associate the combination determined temporal data value with the first action by determining that at least one of the determined current time value falls within a range of values that is associated with said mutually exclusive action and is selected from the group consisting of a specified range of hours, a specified range of day of week values and a specified range of date of year values.

15. The computer program product of claim 14, wherein the computer readable program code instructions for execution by the processor further cause the processor to:
   associate the combination determined temporal data value with the first action by matching at least three different determined temporal and road condition data values to respective values associated with the first action that are selected from a specified range of hours, a specified range of dates, a threshold amount of accumulated snow, a scheduled date of a special event, and a location of the road within an impact area defined for the special event.

16. The computer program product of claim 15, wherein the computer readable program code instructions for execution by the processor further cause the processor to:
   determine that the location of the road is within the impact area defined for the special event in response to determining that the location of the road is within an impact radius from a location of the special event; and
   determine a length of the impact radius in proportion to an estimated occupancy of the special event.

17. The computer program product of claim 15, wherein the computer readable program code instructions for execution by the processor further cause the processor to:
   drive the active electronic display to visually distinguish the indicated active traffic requirement from the indicated time or road condition value via use of an attribute that is selected from the group consisting of different font sizing, different styles, different coloring and different flashing light periodicities.

* * * * *